United States Patent [19]

Nederman

[11] Patent Number: 4,661,129
[45] Date of Patent: Apr. 28, 1987

[54] FILTER CLEANING DEVICE

[75] Inventor: Bill P. P. Nederman, Helsingborg, Sweden

[73] Assignee: AB Ph. Nederman & Company, Sweden

[21] Appl. No.: 737,208

[22] Filed: May 23, 1985

[30] Foreign Application Priority Data

May 30, 1984 [SE] Sweden .................................. 8402918

[51] Int. Cl.⁴ ...................... B01D 27/06; B01D 29/06; B01D 29/38

[52] U.S. Cl. ..................................... 55/218; 55/283; 55/289; 55/290; 55/299; 55/304

[58] Field of Search ................. 55/210, 218, 283, 290, 55/299, 304, 305, 428, 432, 284, 289; 210/396

[56] References Cited

U.S. PATENT DOCUMENTS

| | | | |
|---|---|---|---|
| 737,438 | 8/1903 | Meyerott | 55/304 X |
| 2,555,087 | 5/1951 | Hochmuth | 210/396 X |
| 3,343,342 | 9/1967 | DuRocher | 55/299 |
| 3,606,735 | 9/1971 | Baigas, Jr. | 210/506 X |
| 3,784,017 | 1/1974 | Arnold et al. | 210/396 X |
| 3,898,414 | 8/1975 | Hawley | 55/299 X |
| 4,222,754 | 9/1980 | Horvat | 55/284 X |
| 4,222,755 | 9/1980 | Grotto | 55/304 X |
| 4,284,422 | 8/1981 | Ferland | 55/432 X |
| 4,388,091 | 6/1983 | Khosropour | 55/432 X |

Primary Examiner—Robert Spitzer
Attorney, Agent, or Firm—Bacon & Thomas

[57] ABSTRACT

The present invention relates to a filter cleaning device, preferably for the cleaning of gases, such as welding fumes. To provide a filter cleaning device which efficiently cleans the filter without need for dismounting it, the filter cleaning device comprises at least one rotary filter (10) with outwardly directed projections (17), and at least one impeding device (12) which upon rotation of the filter (10) causes the projections (17) to give way and permits them to revert, whereby a shaking movement is imparted to the projections (17) to make them shake off the impurities adhering to them and toss the impurities aside by the action of the rotation of the filter (10).

12 Claims, 5 Drawing Figures

FILTER CLEANING DEVICE

This invention relates to a filter cleaning device, preferably in filters for the cleaning of gases, such as welding fumes.

To clean filters, such as welding fume filters, the filter container must be opened, the filter removed, placed in a bath and after cleaning therein refitted in the filter container. This involves comprehensive mounting work in the course of which the welding operation has to be discontinued. Since welding fume filters are rapidly clogged, especially when the welding fumes are very contaminated, the dismounting of the filter and the cleaning and refitting thereof must often be performed several times per workday. As a consequence, many irritating interruptions of the welding work will occur, from which losses of time result.

In certain filtration devices the filter cassettes are cleaned with air jets. This requires air of high quality, i.e. dry air. In many cases of installation, however, air of the desired quality and in the requisite amount is not available.

There are also many different types of shaking systems for cleaning filter cassettes. But these are frequently disadvantageous in that the filter material is heavily worn and that the cleaning operation leads to redirtying of the filter.

The object of the present invention is to eliminate these drawbacks and to provide a filter cleaning device which effectively cleans the filter without necessitating removal of the filter nor the installation of expensive compressors. Neither does there arise any undesired high wear or redirtying of the filter. This is realized according to the invention substantially with the aid of the features appearing from the appendant claim 1.

According to the main characteristic feature of the filter cleaning device the filter will effectively shake loose the impurities which are tossed away from the filter by the rotary movement thereof so that there is no risk of the filter being redirtied.

The invention will be more fully described below with reference to the accompanying drawings in which.

Figure 5:
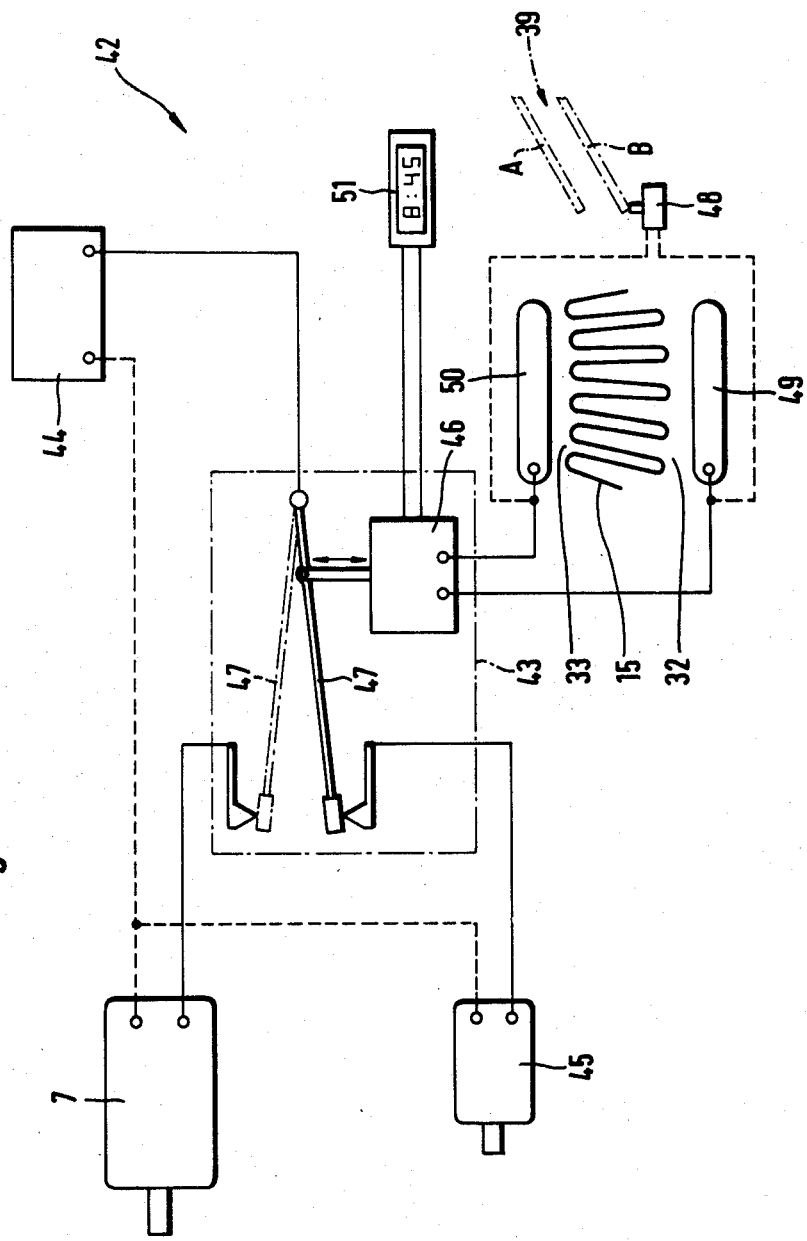

FIG. 5 diagrammatically illustrates a rotation control apparatus for controlling the rotation of the filter.

The filtration device illustrated in the drawings is intended for the filtration of contaminated welding fumes or other contaminated gases, preferably such as occur in places of work.

The filtration device 1 comprises a filter container 2 which is composed of a plurality of parts which can be mounted together, viz. a filter casing 3 having a gas inlet 4; two end walls 5 and 6 which can be screwed to the filter casing 3; a fan housing 8a to be disposed on one end wall 6 and having a suction fan 8 and a gas outlet 9 for the discharge of cleaned gas; a filter cartridge 10 removably mounted in the filter casing 3 for rotation in the end walls 5 and 6; an electric motor 7 disposed on one end wall 6 to rotate the filter cartridge 10; impeding means 12 comprised in the filter casing 3 and cooperating with the filter cartridge 10; a baffle 13 disposed between the gas inlet 4 and the filter cartridge 10 to prevent sparks and other incoming hot particles from impinging on the filter cartridge 10; and finally a collection assembly 14 connected to the filter casing 3 for collection of impurities from the filter cartridge 10.

The filter cartridge 10 consists of a filter body 15 in the form of a pleated cylinder of a suitable filter material 16, for instance about 0.7 mm thick filter paper. The filter body 15 is pleated in such a way that the filter material 16 will form outwardly directed projections 17. The filter body 15 is provided with an end wall face 18 having an axially extending tubular outlet socket 19 and a gear 20. The other side of the filter body 15 is provided with an end wall face 21 having a hole 22 for a pin 24 on a cover 25 which is adapted to be applied to the outer side of the end wall 5 and to close the opening 5a of the end wall 5 for the filter cartridge 10. The end wall 6 has an outwardly directed collar 26 and the electric motor 7 has a drive gear 27 which is situated inside of the end wall 6.

The impeding means 12 comprises a profile bar 28 which at the bottom of the filter casing 3 extends between the end walls 5, 6 and is retained by them. In a longitudinally extending recess 29 in the profile bar 28 there engages a longitudinal strip 30 of elastic material. Three or more tabs 31 are arranged on said strip 30 to extend a distance in between the projections 17 of the filter cartridge 10 when the latter is mounted in position in the filter casing 3.

For the mounting of the filter cartridge 10 in the filter casing 3 said cartridge is passed through the opening 5a of the end wall 5 and fully introduced into the filter casing 3, the tubular outlet socket 19 of the cartridge penetrating into the outwardly directed collar 26 of the end wall 6. As a result, the filter cartridge 10 will be rotatably mounted in the collar 26 via the tubular outlet socket 19. Moreover, the gear 20 of the filter cartridge will get into driving engagement with the drive gear 27 of the electric motor 7, and the tabs 31 of the impeding means 12 will each be positioned in a gap between the projections 17. Besides the other end wall face 21 of the filter cartridge 10 will bear with its outer edge against the edge portions of the opening 5a so that the filter cartridge 10 can rotate in relation to the end wall face 21 also.

By this design the suction fan 8 will suck contaminated gas via the gas inlet 4 into the inner space 32 of the filter casing 3 and through the filter body 15 to which the impurities will adhere. The gas thus cleaned will flow via a space 33 in the filter body 15, the tubular socket 19 and the suction fan 8 to the gas outlet 9 and via said outlet out of the filtration device 1.

Cleaning of the filter cartridge 10 takes place in that the electric motor 7 is started and the filter cartridge 10 is rotated by said motor in relation to the impeding means 12. At this rotation each projection 17 of the filter body 15 will abut against the tabs 31 which force the projections 17 to give way (see FIG. 3). When being deflected the projections 17 will bend somewhat and because the filter material 16 possesses elastic properties, the projections 17 will flex back in a whiplash manner when they revert after having passed the tabs 31. Subjected to such a whiplash effect the projections 17 will shake off impurities collecting on the outside of the filter material 16. The size of the whiplash effect is dependent upon the type of the filter material 16 and upon the distance over which the tabs 31 protrude in between the projections 17, and can be varied by using a filter material 16 of another type and/or by shifting the tabs 31 so as to change their degree of protrusion. Once each projection 17 has passed the tabs 31 a sufficient number of times they will have shaken off impurities to such an extent that the filter material is entirely free from impurities or substantially entirely free from impurities.

By designing the strip 30 and the tabs 31 (the tabs 31 consist preferably of plastic material which has been riveted to the strip 30) with a predetermined rigidity in relation to the filter material 16, it is possible to attain the requisite shaking action without undesired heavy wear of the filter material 16.

The impurities shaken loose are tossed off the filter cartridge 10 as they are subjected to centrifugal force by the rotation of the filter cartridge 10 and are thus prevented from redirtying the filter material.

If desired, the outer portions of the projections 17, which cooperate with the tabs 31, can be provided with a coating 34 of wear-resistant material. This will increase the rigidity of the impeding means 12 and thus the whiplash effect so that the filter material 16 is not worn to an undesired extent.

Figure 1:
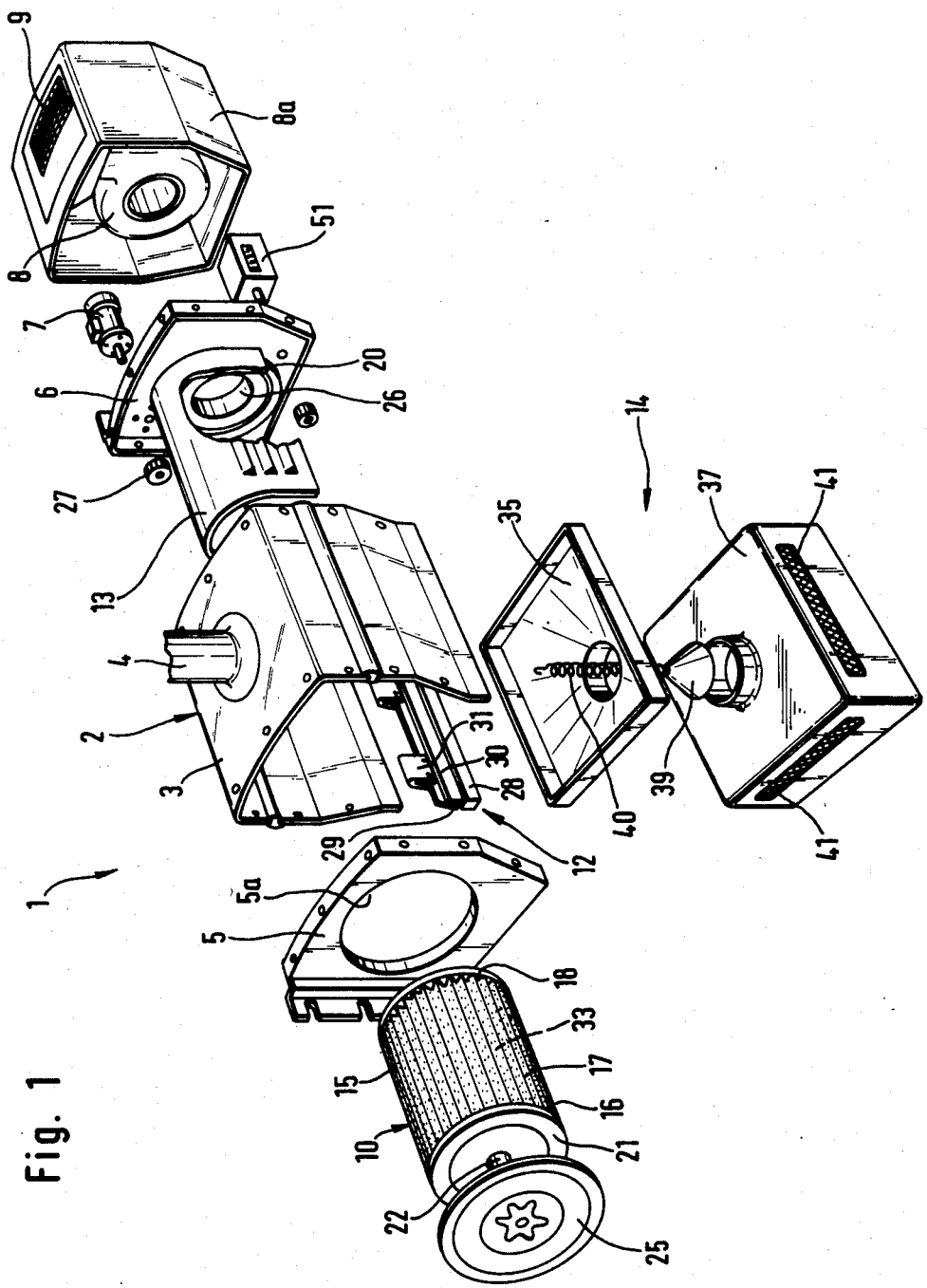
FIG. 1 is an exploded view of a filter container comprising a filter cleaning device according to the invention.
Figure 2:
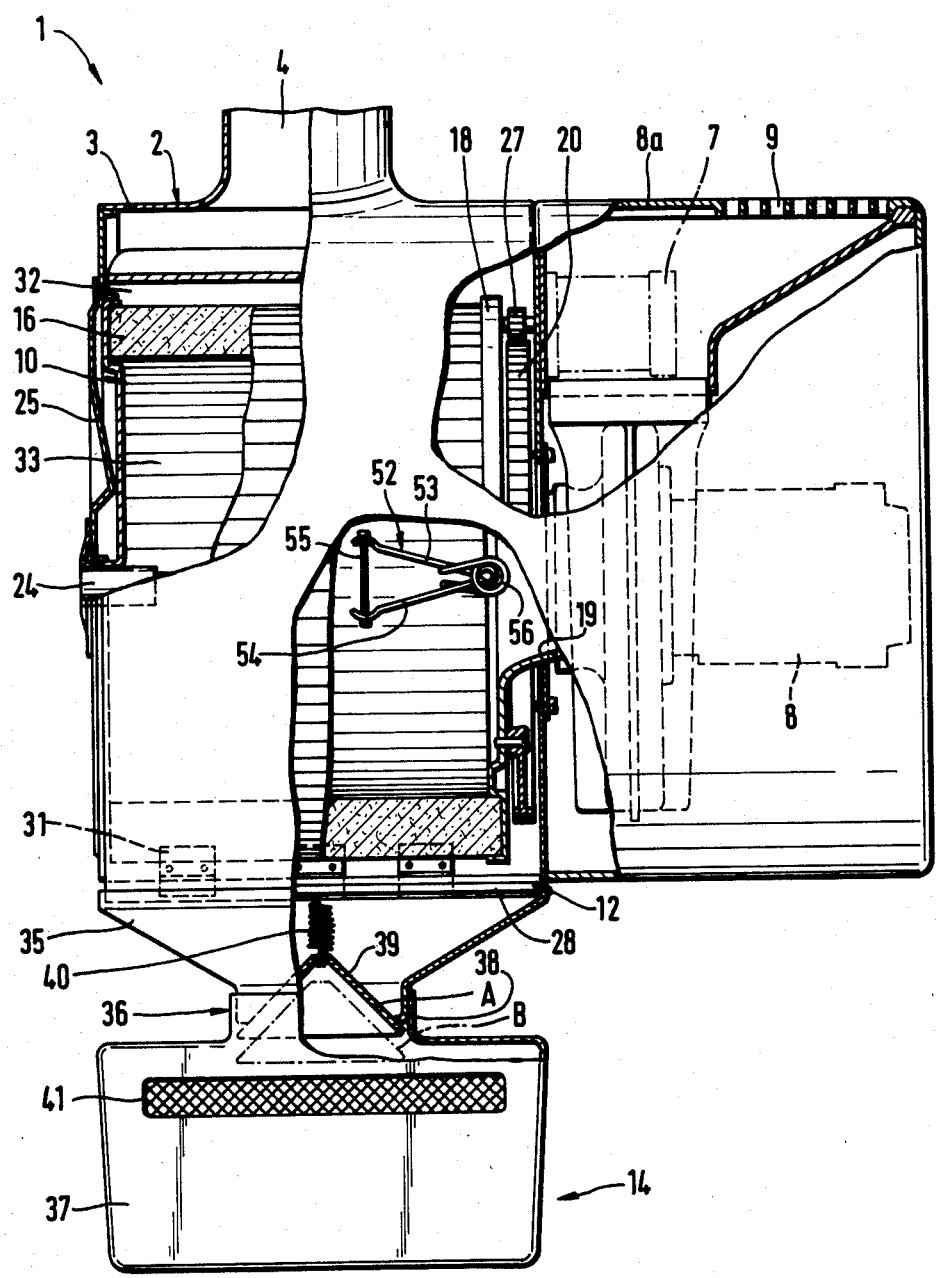
FIG. 2 is a side view and part section of the filter container in FIG. 1.

The impurities shaken loose fall down into a hopper-shaped portion 35 of the collection assembly 14. Said hopper-shaped portion 35 has a downwardly directed connection 36 joining the hopper-shaped portion 35 to a collection receptacle 37 for collection of the impurities. In the connection 36 there is provided a valve seat 38, and on the profile bar 28 of the impeding means there is suspended a valve member 39 via a spring 40. The weight of said valve member 39 and the spring force of the spring 40 are so selected that the pressure (pressure below atmospheric) generated in the space 32 when the suction fan 8 is operating, causes the valve member 39 to rise and engage the valve seat 38 to close the connection 36. When the connection 36 is closed gas (air) is prevented from flowing via an opening 41 in the collection receptacle 37 into the space 32. When the suction fan 8 stops or when the pressure below atmospheric in the space 32 diminishes because the filter cartridge 10 is clogged by impurities, the action of the pressure below atmospheric on the valve member 39 will cease or diminish so that the valve member 39 sinks, thus leaving the valve seat 38 and opening the connection 36, whereby impurities can fall down into the collection receptacle 37 through said connection 36. In FIG. 2 the valve member 39 is shown in closed position (position A) by full lines and in open position (position B) by dash and dot lines.

The valve member 39 of the valve mechanism 38, 39 may be adapted to cooperate with a control apparatus 42 for controlling the rotation of the filter cartridge and/or the operation of the suction fan and/or the position of a damper (not shown, which is intended to control the air flow to, inside or from the filtration device) in dependence upon the pressure in the space 32. The control apparatus 42 comprises a switch mechanism 43 which registers the supply of current from a current source 44 either to the electric motor 7 for rotation of the filter cartridge 10 or to a drive 45 for driving the suction fan 8 and/or a damper. The switch mechanism 43 of the control apparatus 42 comprises a relay 46 keeping a contact means 47 in a position (shown by full lines) in which the current source 44 is connected to the drive 45. If the pressure below atmospheric in the space 32 changes so that it is no longer capable of retaining the valve member 39 in position A (because the suction fan 8 is stopped and/or the damper is shut or the filter cartridge 10 is clogged by impurities to a certain extent), the valve member 39 sinks to position B thereby actuating a contact means 48 (shown by broken lines in FIG. 5) which cooperates with the relay 46 and causes it to shift the contact means 47 to a position (shown by dash and dot lines) in which the operation of the drive 45 is interrupted and the current source 44 is switched to the electric motor 7 instead so that the rotation of the filter cartridge 10, i.e. the cleaning function, is started. When the pressure below atmospheric in the space 32 again changes, because the filter cartridge 10 has been cleaned or for other reasons, to such an extent that the valve member 39 again changes position, the contact means 47 also changes position, whereby the rotation of the filter cartridge 10 is stopped and the drive 45 is started.

The control apparatus 42 can be actuated by the pressure in the space 32 in a manner other than via a valve mechanism 38, 39. Thus there may be arranged in the space 32 for the filter cartridge 10 a pressure sensing means 49 and in the space 33 within the filter cartridge 10 proper another pressure sensing means 50. With the aid of these pressure sensing means 49, 50 the pressure difference over the filter cartridge 10 can be sensed and when said pressure difference exceeds a certain value—because the filter body 15 reaches an undesired clogging level of impurities—the switch mechanism 43 is actuated so as to cause the contact means 47 to interrupt the operation of the drive 45 and start the operation of the electric motor 7, i.e. the rotation of the filter cartridge 10. When the pressure difference over the filter body 15 again sinks to a lower value—because the filter body 15 has been cleaned from impurities to a sufficient extent—the switch mechanism 43 is caused to reset the contact means 47 for interruption of the operation of the electric motor 7, i.e. the rotation of the filter cartridge 10, and for starting of the operation of the drive 45.

The control apparatus 42 also comprises a timer 51 which allows timing of the electric motor 7 and the drive 45. The timer 51 cooperates with the relay 46 in such a manner that said relay for instance interrupts the operation of the drive 45 (the suction fan 8 and/or the damper) via the contact means at a given time and starts the operation of the electric motor 7 (start of the rotation of the filter cartridge). The timer 51 can control the relay 46 such that it maintains this position of the contact means 47 for a given time, whereupon said relay switches the contact means 47 to the initial position. Alternatively, the timer 51 can control the relay 46 such that it performs the latter switching of the contact means 47 at a given time. With the aid of this timer the rotation of the filter cartridge, i.e. the cleaning of the filter, can be started after the filtration work of the filtration device and proceed as long as no filtration is going on. Thus cleaning can take place automatically during predetermined breaks on a workday and immediately after the workday has expired.

By reason of the functions of the control apparatus 42 the filtration stops and the cleaning starts automatically when the filter need be cleaned because a certain clogging level is exceeded and/or because frequent cleaning operations are desired when the filtration function is not exploited on account of breaks in the work with the filter or after work with the filter.

The filtration device 1 illustrated in the drawings also comprises a safety device in the form of a fire damper 52 which is adapted to close the tubular outlet socket 19 in dependence on the temperature in the space 32 and/or the space 33. The fire damper 52 is mounted in the end wall face 18 of the filter cartridge 10 and consists of damper disks 53 and 54 which are held in a folded-together position (shown by full lines in FIG. 2) by releasae means 55, e.g. a heat-sensitive wire. The damper disks 53, 54 are moved apart by the action of a coil spring 56. If the temperature in any of or both spaces 32, 33 rises above a predetermined limit, for instance in that fire arises in the filter material or said material begins to glow, the release means 55 melts and the damper disks 53, 54 are urged apart by the coil spring 56 so as to obstruct the entrance to the tubular outlet socket 19 (see the positions of the damper disks indicated by dash and dot lines in FIG. 2). As a consequence, the fire cannot spread through the outlet of the filtration device 1, which might otherwise be the case by reason of the fanning action of the suction fan.

Figure 3:
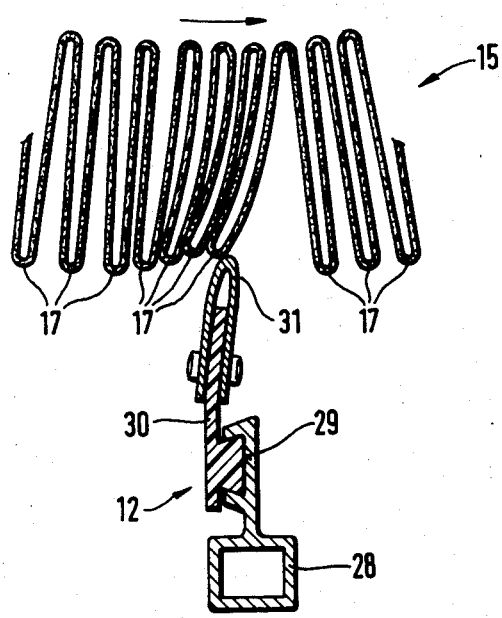
FIG. 3 is a section of part of a filter in the filter container and of impending means cooperating therewith.
Figure 4:
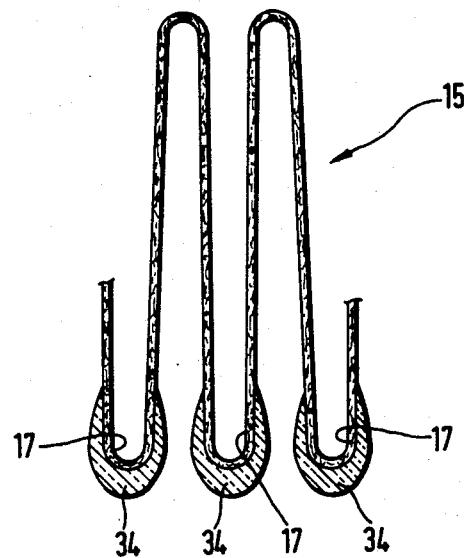
FIG. 4 is a section of a part of another filter.

The present invention is not restricted to the embodiment described above and illustrated in the drawings. Thus the filter cleaning device can be used in connection with filtration devices other than filters for filtration of welding fumes, and the filter to be cleaned may be of another type than the filter cartridge shown. The number of filters to be cleaned may also vary. If use is made of a filter cartridge of the type illustrated the end wall face 18 with its gear 20 (or merely the gear 20) may be removably mounted on the filter body 15 such that the gear 20 and possibly the end wall face 18 can be loosened from a spent filter body 15 and reused by application to a fresh filter body 15. The end wall face 21 also may be removable for the same reason. The filter body 15 may be pleated altogether to form the projections 17 as shown in FIG. 3, or the filter body can comprise inner parts from which the projections extend. The impeding means 12 is preferably positioned between the filter cartridge 10 and the collection assembly 14 in order that the filter cartridge shall discharge its impurities at the bottom and that said particles shall be tossed away downwardly towards the collection assembly 14, which implies a reduced risk of the filter cartridge 10 being redirtied. The design of the impeding means 12 may vary depending int. al. on the type of filter with which it is used and it may have one or more tabs 31 and/or several units arranged at various points around the filter. Besides the impeding means 12 may comprise units which are mounted for rotation about the filter or are movable in another manner. The parts 31 of the impeding means 12 each penetrate between two projections 17 at a time, but there may be parts that penetrate between two successive projections 17. The rotation of filter may in a simple equipment be brought about manually instead of by means of an electric motor, and a smoke exhausting or other gas exhausting device (not shown) may be connected to the filtration device. The control system 12 may be otherwise designed and possess further functions and the rotary speed of the filter may be variable and/or adjustable to sundry types of filters and/or impeding means.

I claim:
1. Filter device for cleaning gases comprising:
   (a) a filter casing having a bottom, a gas inlet, a gas outlet and an impurity outlet;
   (b) a filter cartridge having a plurality of radially oriented projections;
   (c) mounting means to removably and rotatably mount the filter cartridge within the filter casing such that it may rotate about an axis extending in a substantially horizontal direction, the mounting means comprising:
      (i) first and second openings defined in opposite end walls of the filter casing;
      (ii) a tubular outlet socket attached to one end of the filter cartridge and adapted to rotatably fit into the first opening;
      (iii) a cover member adapted to fit over the second opening; and,
      (iv) means to rotatably attach the cover member to the filter cartridge.
   (d) fan means operatively communicating with the gas outlet so as to draw contaminated gas into the filter casing through the gas inlet such that it passes through the filter cartridge, thereby removing impurities from the gas;
   (e) a first driving motor drivingly connected to the fan means;
   (f) drive means to rotate the filter cartridge about the substantially horizontal axis comprising;
      (i) a driven gear attached to the filter cartridge;
      (ii) a second driving motor
      (iii) a driving gear attached to the second driving motor and engaging the driven gear;
   (g) at least one impeding means stationarily attached to the bottom of the filter casing and having a portion extending toward the filter cartridge such that it contacts a lower portion of the radial projections thereof as the filter cartridge rotates imparting a shaking movement to them to remove entrapped impurities from the filter cartridge thereby causing them to fall away from the filter cartridge due to the effects of gravity and the centrifugal force generated by the rotation of the filter cartridge to prevent re-clogging the filter cartridge; and,
   (h) control circuit means connecting the first and second driving motors to a source of power, the control circuit means including switch means movable between a first position wherein only the first driving motor is connected to the power source and a second position wherein only the second driving motor is connected to the power source such that the filter cartridge rotates only when the fan means is inoperative.

2. A filter device as claimed in claim 1, wherein at least one of the projections or the portion of the impeding means which contacts said projections are flexible in order that whiplash shaking movements are imparted to the projections by bending said projections or the portion in contact therewith and allowing them to flex back.

3. A filter device as claimed in claim 1 wherein the impeding means is disposed between the filter cartridge and the impurity outlet of the filter casing.

4. A filter cleaning device as claimed in claim 1 wherein a portion of the impeding means penetrates between two projections at a time, said portion being exchangeable, and further comprising a coating of wear-resistant material applied to the projections.

5. A filter device as claimed in claim 1 further comprising a fire damper adapted to close the gas outlet from a space within the filter cartridge if the temperature in said space exceeds a pre-determined limit.

6. A filter device as claimed in claim 1 further comprising a collection receptacle communicating with the impurity outlet of the casing to collect impurities removed from the filter; a valve mechanism movable between closed and open positions to close or open a connection between the filter casing and the collection receptacle; and, operating means for said valve mechanism to maintain the connection closed or open in dependence on the pressure in a space surrounding the filter cartridge.

7. A filter device as claimed in claim 6 wherein the control circuit means further comprises means operatively connecting the valve mechanism to the switch means such that when the valve mechanism moves from the closed to the open position, the switch means moves from the first position to the second position and vice versa.

8. A filter device as claimed in claim 1 wherein the control circuit means further comprises:
   (a) gas pressure sensing means to sense the difference in gas pressure between a space outside of the filter cartridge and within the filter cartridge; and,
   (b) actuating means interconnecting the gas pressure sensing means and the switch means such that the switch means is moved between its first and second positions when the difference in gas pressure reaches a pre-determined value.

9. A filter device as claimed in claim 1 wherein the filter casing comprises opposite sides; a top interconnecting the sides and defining the gas inlet; first and second end walls interconnecting the top and sides, the first end wall defining the gas outlet; said bottom being hopper shaped and attached to the end walls and sides, the bottom defining the impurity outlet.

10. A filter device as claimed in claim 1 further comprising baffle means to prevent hot impurity particles from impinging on the filter cartridge.

11. A filter device as claimed in claim 10 wherein the baffle means is disposed between the filter cartridge and the gas inlet.

12. A filter device as claimed in claim 1 wherein the control circuit means further comprises:
   (a) actuating means operatively connected to the switch means to move the switch means between its first and second positions; and,
   (b) clock means operatively associated with the actuating means such that the actuating means may be operated at pre-determined time intervals.

* * * * *